United States Patent
Sane et al.

(10) Patent No.: US 9,360,257 B2
(45) Date of Patent: Jun. 7, 2016

(54) TRANSIENT HEATING BURNER AND METHOD

(71) Applicant: AIR PRODUCTS AND CHEMICALS, INC., Allentown, PA (US)

(72) Inventors: Anup Vasant Sane, Allentown, PA (US); Shailesh Pradeep Gangoli, Easton, PA (US); Aleksandar Georgi Slavejkov, Allentown, PA (US); Michael David Buzinski, Slatington, PA (US); Jeffrey D. Cole, Nazareth, PA (US); Reed Jacob Hendershot, Orefield, PA (US); Xiaoyi He, Orefield, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 255 days.

(21) Appl. No.: 14/193,698

(22) Filed: Feb. 28, 2014

(65) Prior Publication Data

US 2015/0247673 A1    Sep. 3, 2015

(51) Int. Cl.
| | |
|---|---|
| *F27D 19/00* | (2006.01) |
| *F23N 1/02* | (2006.01) |
| *F23C 5/08* | (2006.01) |
| *F23D 14/84* | (2006.01) |
| *F27D 99/00* | (2010.01) |

(52) U.S. Cl.
CPC . *F27D 19/00* (2013.01); *F23C 5/08* (2013.01); *F23D 14/84* (2013.01); *F23N 1/02* (2013.01); *F27D 99/0033* (2013.01); *F27D 2019/004* (2013.01); *F27D 2099/004* (2013.01)

(58) Field of Classification Search
CPC .............................. F27D 2019/004; F23N 1/02
USPC .......................................................... 266/268
See application file for complete search history.

(56) References Cited

U.S. PATENT DOCUMENTS

| | | | |
|---|---|---|---|
| 3,476,321 A | 11/1969 | Levaux | |
| 4,586,893 A * | 5/1986 | Somerville | F23N 1/022 123/672 |
| 5,037,291 A * | 8/1991 | Clark | F23N 1/022 431/12 |
| 5,554,022 A | 9/1996 | Nabors, Jr. et al. | |
| 5,611,682 A | 3/1997 | Slavejkov et al. | |
| 6,074,197 A | 6/2000 | Philippe | |
| 6,866,503 B2 | 3/2005 | Ladharam | |
| 2006/0275724 A1 | 12/2006 | Joshi et al. | |

(Continued)

FOREIGN PATENT DOCUMENTS

| | | |
|---|---|---|
| CN | 1873329 A | 12/2006 |
| DE | 102011014996 A1 | 9/2012 |

(Continued)

*Primary Examiner* — Scott Kastler
(74) *Attorney, Agent, or Firm* — Larry S. Zelson

(57) ABSTRACT

A transient heating burner including at least two burner elements each having a distribution nozzle configured to flow a fuel, and an annular nozzle surrounding the distribution nozzle and configured to flow an first oxidant, at least one staging nozzle configured to flow a second oxidant, and a controller programmed to independently control the fuel flow to each distribution nozzle such that at least one of the distribution nozzles is active and at least one of the distribution nozzles is passive, wherein an active distribution nozzle fuel flow is greater than an average fuel flow to the distribution nozzles and a passive nozzle fuel flow is less than the average fuel flow, and to control a staging ratio to be less than or equal to about 75%.

17 Claims, 8 Drawing Sheets

(56) References Cited

U.S. PATENT DOCUMENTS

| | | |
|---|---|---|
| 2007/0037106 A1 | 2/2007 | Kobayashi et al. |
| 2013/0095437 A1 | 4/2013 | Buragino et al. |
| 2013/0143168 A1 | 6/2013 | Gangoli et al. |
| 2014/0144353 A1 | 5/2014 | Kasseck et al. |
| 2015/0247673 A1 * | 9/2015 | Sane .................. F23N 1/02 266/44 |

FOREIGN PATENT DOCUMENTS

| | | |
|---|---|---|
| TW | 201219721 A1 | 9/2010 |
| WO | 2012130725 A1 | 10/2012 |

* cited by examiner

TRANSIENT HEATING BURNER AND METHOD

BACKGROUND

This application relates to a burner and method for heating a furnace, and in particular an industrial melting furnace, to provide enhanced heat transfer while improving uniformity of heating and reducing potential overheating and oxidizing conditions at a melt bath surface.

In a conventional system, the heat, provided by a stationary flame, is not directed towards the melt, thereby limiting the heat transfer from the flame to the melt. Moreover, if a conventional system were modified to direct a stationary flame toward the melt, undesirable overheating and oxidation of the metal may occur. An approach to avoid overheating, as taught in U.S. Pat. No. 5,554,022, is to direct a low momentum flame toward the melt and then impinge of high momentum jet onto the low momentum flame, causing the flame to move. However, in this approach there is still a significant potential for metal oxidation and buoyant flames that can interact with and overheat the furnace refractory.

SUMMARY

A transient heating burner and method provide enhanced flame coverage and view factors in a furnace. The configuration of the burner enables optimum heat flux delivery both spatially and temporally so that a uniform temperature distribution can be achieved and maintained in a furnace. Uniform heat flux is achieved by directing the heat flux to appropriate locations, for example as determined by an algorithm, based on furnace geometry, or based on real-time feedback from one or more sensors, for certain amounts of time. The burner and method enable selectively longer and more penetrating flames that can impinge the charge in a furnace to provide improved melting, while minimizing oxidative melt losses. In particular, multiple high momentum flames are directed towards the melt in a cyclical manner. Overheating is avoided and energy is distributed more evenly over the melt bath. The burner is also capable of generating vortices by selectively modulating multiple flames. In particular, the burner has a plurality of separate burner elements, each with its own flame in a passive or active state, that can be modulated in various patterns and frequencies to achieve the desired heat flux profile.

Various embodiments of a transient heating burner are described. The burner includes at least two burner elements each having a distribution nozzle configured to flow a fuel and an annular nozzle surrounding the distribution nozzle and configured to flow a first oxidant, and at least one staging nozzle configured to flow a second oxidant. A controller is programmed to independently control the fuel flow to each distribution nozzle and to control a staging ratio to be less than or equal to about 75%. The controller controls flow so that at least one of the distribution nozzles is active and at least one of the distribution nozzles is passive, wherein fuel flow in an active distribution nozzle is greater than an average fuel flow to the distribution nozzles and fuel flow in a passive distribution nozzle is less than the average fuel flow to the distribution nozzles. The staging ratio is the ratio of the oxygen contained in the second oxidant flow to the sum of the oxygen contained in the first and second oxidant flows.

The burner elements may be spaced substantially evenly apart in a circumscribed circle, and the staging nozzle is positioned within the circumscribed circle. In one aspect, the burner includes three burner elements each spaced 120° apart from adjacent burner elements. In another aspect, the burner includes four burner elements each spaced 90° apart from adjacent burner elements. In further aspects, the burner may include five or six burner elements spaced evenly around a circumscribed circle.

In one aspect, at least one of the burner elements is angled radially outward at an angle $\alpha$ from the circumscribed circle. The burner elements may all be angled at the same angle $\alpha$, or each burner element, n, may be angled radially outward at a different angle $\alpha_n$. The angle $\alpha$ is preferably less than or equal to about 60° and more preferably from about 10° to about 40°.

In another aspect, at least one of the burner elements is angled tangentially at an angle $\beta$ with respect to the circumscribed circle. The angle $\beta$ is preferably less than or equal to about 60°, and more preferably from about 10° to about 40°.

In another embodiment of a burner, the burner elements and the staging nozzle are positioned generally collinearly with each staging nozzle located approximately equidistant between two burner elements. In one aspect, the burner has at least three staging nozzles, including a central staging nozzle, and at least four burner elements positioned alternately with the staging nozzles. In another aspect, the burner elements and the staging nozzles on either side of the central staging nozzle are angled at an angle $\gamma$ away from the central staging nozzle.

In another embodiment of a burner, the distribution nozzles and annular nozzles of the burner elements each have a cross-section with a minor axis and a major axis at least 1.5 times as long as the minor axis. At least two staging nozzles are positioned generally collinearly and substantially parallel to the major axes, and are adjacent to each burner element.

In another embodiment of a burner, the staging nozzle has a cross-section with a minor axis and a major axis at least 1.5 times as long as the minor axis, and at least two burner elements are positioned collinearly, and are adjacent to the staging nozzle and substantially parallel to the major axis. In one aspect, the burner elements are angled outward from the minor axis of the staging nozzle at an angle $\phi$ of less than about 45°.

The controller is programmed to control fuel flow to a passive distribution nozzle to be greater than zero and less than or equal to half the flow rate of an active distribution nozzle. In one embodiment, the controller is programmed to control the staging ratio to be less than or equal to about 40%.

In another embodiment, the fuel exiting an active distribution nozzle has an active jet velocity and oxidant exiting the staging nozzle has a staging jet velocity, and the controller is programmed to control the ratio of the staging jet velocity to the active jet velocity to be at least about 0.05 and less than 1. Preferably, the ratio of the staging jet velocity to the active jet velocity is controlled to be from about 0.1 to about 0.4.

In one aspect, the first oxidant flowing through the annular nozzles has an oxygen concentration of equal to or greater than about 70%. In another aspect, the second oxidant flowing through the staging nozzle has an oxygen concentration of equal to or greater than about 20.9%.

In another aspect, an active distribution nozzle has an active jet flow rate and wherein a passive distribution nozzle has a passive jet flow rate, and the controller is programmed to control the ratio of the active jet flow rate to the passive jet flow rate to be from about 5 to about 40. Preferably, the controller is programmed to control the ratio of the active jet flow rate to the passive jet flow rate to be from about 15 to about 25.

In another aspect, a burner element having a passive distribution nozzle has an equivalence ratio from about 0.2 to about 1. In another aspect, a burner element having an active distribution nozzle has an equivalence ratio of from about 1 to about 10. The equivalence ratio is the ratio of theoretical stoichiometric oxidant flow through the annular nozzle to actual oxidant flow through the annular nozzle to combust the fuel flowing through the distribution nozzle.

In another embodiment, a sensor is configured to provide a signal to the controller. The controller is programmed to control each distribution nozzle to be active or passive based on the signal. The sensor is selected from the group consisting of temperature sensors, radiation sensors, optical sensors, cameras, color sensors, conductivity sensors, proximity sensors, and combinations thereof.

In one embodiment, the first oxidant and the second oxidant have the same oxygen concentration. In another embodiment, the first oxidant and the second oxidant have different oxygen concentrations.

In one embodiment, the staging nozzle includes a swirl vane to impart swirl to the second oxidant.

A method of operating a burner in a furnace is described, the burner having at least one staging nozzle and at least two burner elements each comprising a distribution nozzle surrounded by an annular nozzle. The method includes flowing oxidant at a staging flow rate through the staging nozzle, flowing oxidant at a primary oxidant flow rate through each of the annular nozzles, selecting at least one of the distribution nozzles to be active and at least one of the distribution nozzles to be passive, flowing fuel at an active jet flow rate through the active distribution nozzles, and flowing fuel at a passive jet flow rate through the passive distribution nozzles, wherein the active jet flow rate is greater than an average fuel flow rate through the distribution nozzles and the passive jet flow rate is less than the average fuel flow rate through the distribution nozzles.

The method may further include sensing a parameter in the furnace, reselecting which distribution nozzles are active and which distribution nozzles are passive based on the sensed parameter, and periodically repeating the sensing and reselecting steps.

An embodiment of a transient heating burner is described. The burner includes at least two burner elements each having a distribution nozzle configured to flow a first fluid, an annular nozzle surrounding the distribution nozzle and configured to flow a second fluid, and at least one staging nozzle configured to flow a third fluid. The burner further includes a controller programmed to independently control the flow of the first fluid to each distribution nozzle such that at least one of the distribution nozzles is active and at least one of the distribution nozzles is passive, and to control a staging ratio to be less than or equal to about 75%. Flow in an active distribution nozzle is greater than an average flow to the distribution nozzles and flow in a passive distribution nozzle is less than the average flow to the distribution nozzles. The staging ratio is the ratio of the third fluid flow to the sum of the second fluid flow and the third fluid flow. In this embodiment, the first fluid contains one of fuel and oxygen and the second fluid and the third fluid contain the other of fuel and oxygen, wherein the fuel and oxygen are reactants.

Other aspects of the invention are described below.

BRIEF DESCRIPTION OF THE DRAWINGS

FIG. 5a shows a burner having a central staging nozzle surrounded by four burner elements angled radially outward; FIG. 5b shows a burner having a central staging nozzle surrounded by four burner elements angled tangentially along a circumscribed circle; FIG. 5c shows a burner having a collinear arrangement of alternating burner elements and staging nozzles in which all but the central staging nozzle are angled outward; FIG. 5d shows a burner having four collinear burner elements adjacent to and substantially parallel to the major axis of a slotted staging nozzle; and FIG. 5e shows a pair of aligned flat flame burner elements and a pair of collinear staging nozzles adjacent to and substantially parallel to the major axis of each burner element.

DETAILED DESCRIPTION

Figure 1:
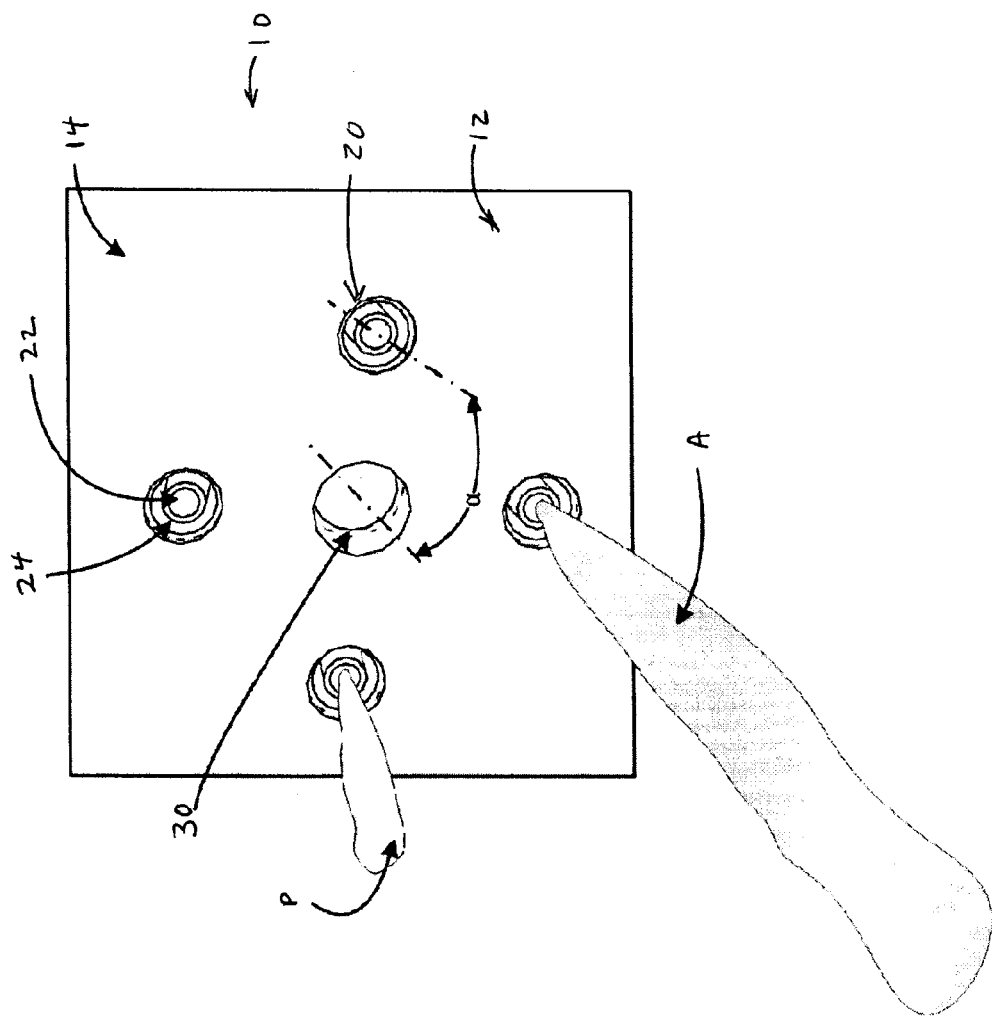
FIG. 1 is an end perspective view of an embodiment of a transient heating burner.

FIG. 1 depicts one embodiment of a transient heating burner 10. The burner 10 includes a body 12 having a face 14, wherein when the burner 10 is mounted in a furnace (for example as in FIG. 7), the face 14 is exposed to the combustion zone in the furnace.

Figure 4:
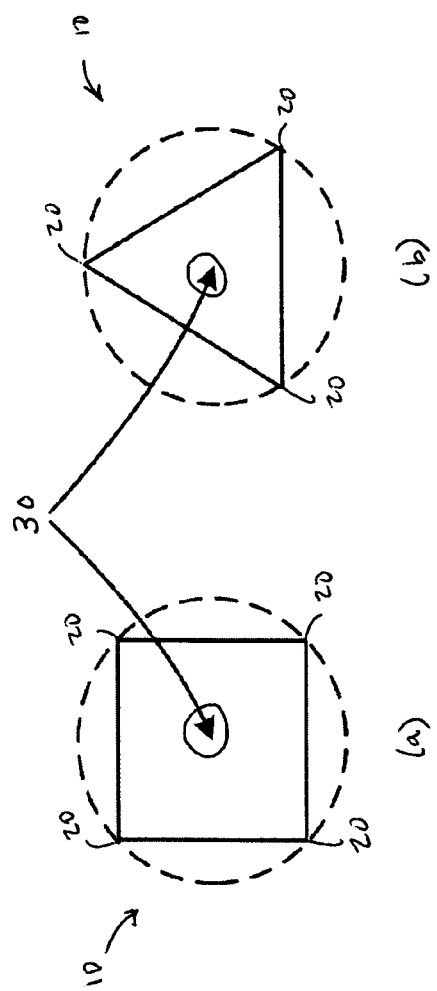
FIG. 4 is an end view schematic showing nozzle orientations for two embodiments of a transient heating burner.

The burner 10 includes a plurality of burner elements 20 oriented so as to define a circumscribed circle (see FIG. 4), with the burner elements 20 preferably equally spaced around the circumscribed circle. At least one staging nozzle 30 is positioned within the circumscribed circle. For reference purposes, an active jet (A) and a passive jet (P) are depicted, to show that the active jet has a larger flame than the passive jet.

The burner 10 depicted in FIG. 1 has four burner elements 20 spaced apart at approximately 90° intervals. However, it is understood that the burner 10 may include any number n of burner elements 20 equal to or greater than two. For example, a burner 10 may have two burner elements 20 spaced so as to be diametrically opposed, or alternately three burner elements 20 spaced apart at approximately 120° intervals, or five or more burner elements 20 spaced apart at approximately even intervals. It is also understood that for some furnace geometries, configurations, or operating conditions, it may be desirable to have a burner 10 with a plurality of burner elements 20 that are unequally spaced apart around the circumscribed circle. In a further alternative, the burner 10 may have a plurality of burner elements 20 that are positioned to define a geometric shape other than a circle, for example an oval or an irregular polygon, depending on the furnace geometry and configuration.

The burner 10 in FIG. 1 has one centrally positioned staging nozzle 30. However, it is understood that a plurality of staging nozzle 30 may be provided, wherein the staging nozzles 30 may be all of the same size or of different sizes. Additionally, depending on furnace geometry, desired flame characteristics, the orientation of the individual burner elements 20, and other factors, the staging nozzle(s) 30 may be positioned off center within the circumscribed circle defined by the burner elements 20. The staging nozzle 30 may be of any shape.

Each burner element 20 includes a distribution nozzle 22 surrounded by an annular nozzle 24. A distributed reactant is flowed through the distribution nozzle 22 while a staged reactant is flowed through the annular nozzle 24, wherein one reactant is a fuel and the other reactant is an oxidant. A portion of the staged reactant is also flowed through the staging nozzle 30. In one embodiment, fuel is flowed through the distribution nozzle 22 as the distributed reactant, while oxidant is flowed through the annular nozzle 24 as the staged reactant. In another embodiment, oxidant is the distributed reactant flowed through the distribution nozzle 22 and fuel is the staged reactant flowed through the annular nozzle 24. The proportion of staged reactant introduced through the annular nozzles 24 as compared with the staging nozzle 30 can be adjusted in order to maintain stable burner operation and/or to control flame properties such as heat release profile.

As used herein, the term "fuel" denotes any hydrocarbon-containing substance that can be used as fuel in a combustion reaction. Preferably, the fuel is a gaseous fuel, such as natural gas, but the fuel may also be an atomized liquid fuel or a pulverized solid fuel in a carrier gas. As used herein, the term "oxidant" denotes any oxygen-containing substance that can oxidize fuel in a combustion reaction. An oxidant may be air, vitiated air (i.e., gas with less than about 20.9% oxygen), oxygen-enriched air (i.e., gas with greater than about 20.9% oxygen), or essentially pure oxygen (i.e., gas with approximately 100% oxygen). In preferred embodiments, the oxidant is an oxygen-enriched air having an oxygen concentration of at least about 26%, at least about 40%, at least about 70%, or at least about 98%.

Figure 6:
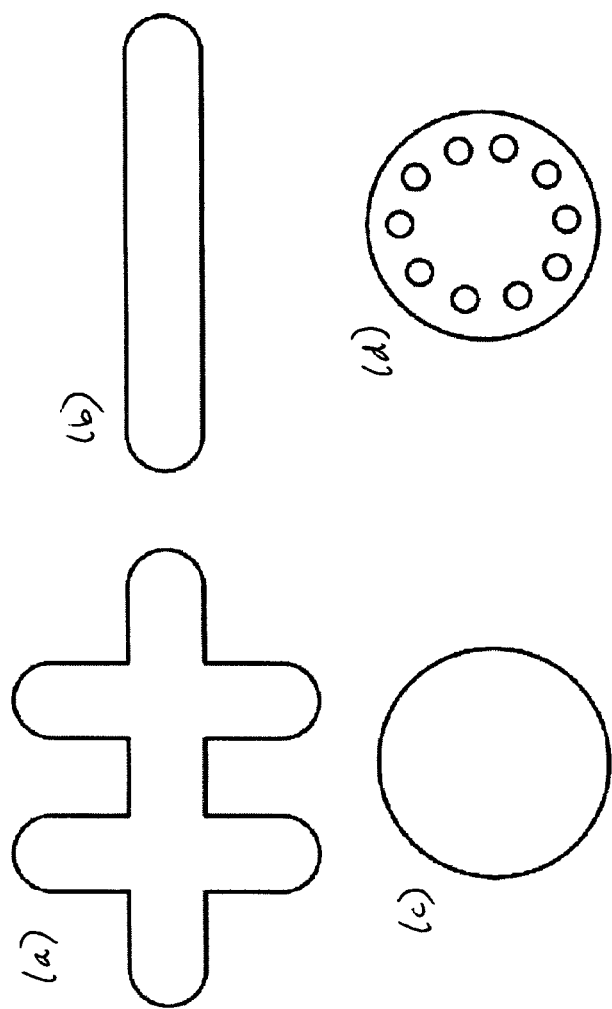
FIG. 6 shows various possible geometries of a distribution nozzle within each burner element.

The distribution nozzle 22 can be of any shape. A subset of possible exemplary shapes is shown in FIG. 6, including a slotted nozzle (FIG. 6a), a single-slot nozzle (FIG. 6b), a circular nozzle (FIG. 6c), and a multi-hole nozzle (FIG. 6d). A more detailed discussion of possible nozzle shapes can be found in U.S. Pat. No. 6,866,503, incorporated herein by reference in its entirety. For example, to create a luminous flame with high radiative transfer properties, a distribution nozzle 22 having a shape factor of less than 10 can be used, while to create a non-luminous flame which may have lower NOx, a distribution nozzle having a shape factor of 10 or greater can be used. Luminous mode might be preferred for melting operations, while non-luminous mode might be preferred for reheating operations. Note that a high shape factor nozzle can include a multi-hole nozzle. As described in detail in U.S. Pat. No. 6,866,503, the shape factor, $\sigma$, is defined the square of the perimeter, P, divided by twice the cross-sectional area, A, or in equation terms:

$$\sigma = P^2/2A.$$

Figure 2:
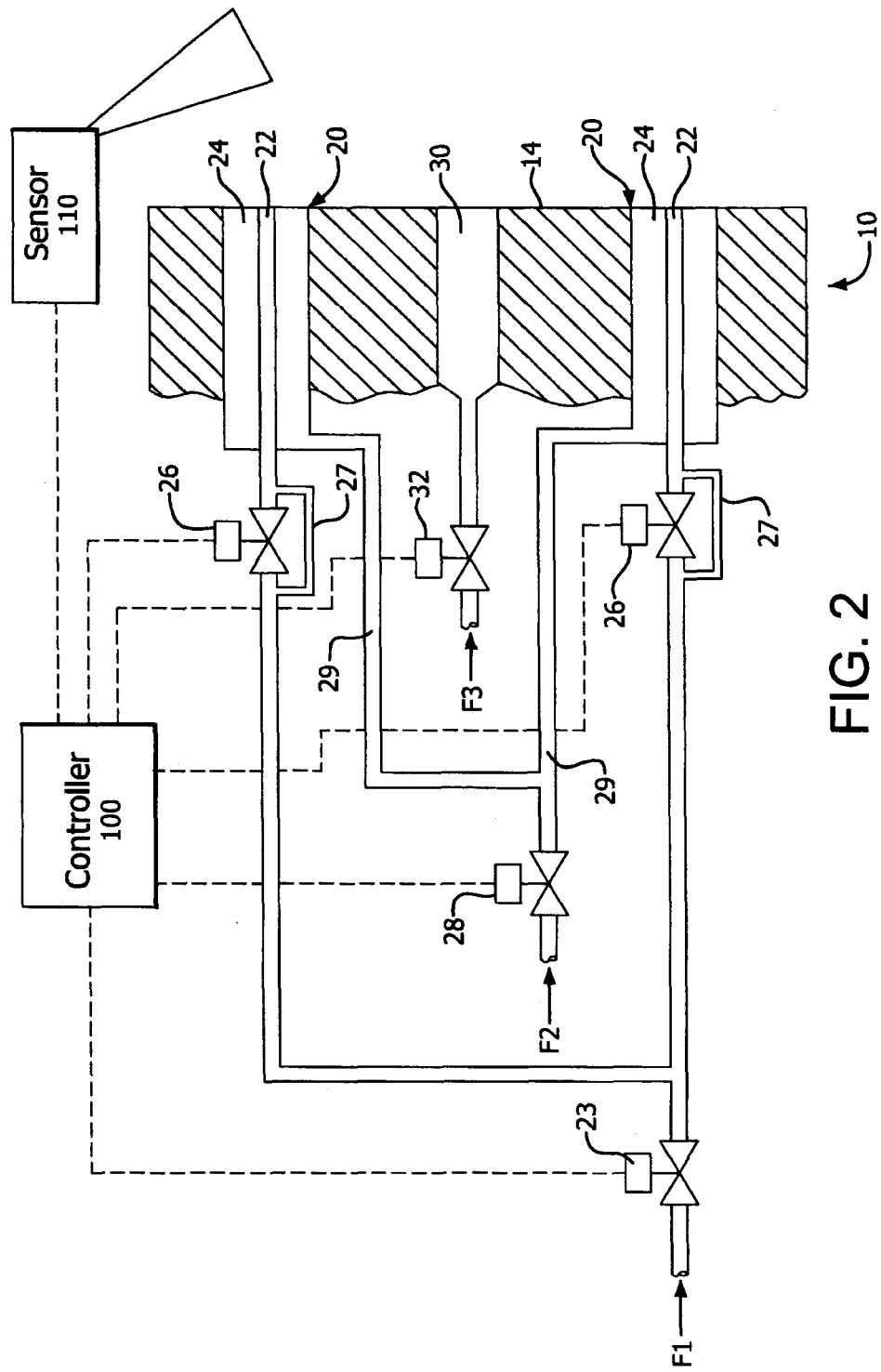
FIG. 2 is a control schematic for an embodiment of a transient heating burner.

FIG. 2 shows a simplified control schematic for a burner 10 as described above. A first fluid F1 is supplied to the distribution nozzles 22 at a total flow rate controlled by a control valve 23. The flow of the first fluid F1 to each distribution nozzle 22 is separately controlled. In one embodiment, a control valve 26 upstream of each distribution nozzle 22 is modulated between a high flow and a low flow position, corresponding respectively to an active state and a passive state for the burner element 20 containing that distribution nozzle 22. In an alternate embodiment, the control valve 26 is positioned in parallel with a bypass passage 27. In this embodiment, the control valve 26 is modulated between an open position and a closed position, again corresponding respectively to active and passive states of the burner element 20, while the bypass passage 27 allows a relatively small amount of flow to bypass the control valve 26 so that some of the first fluid F1 is always flowing to the distribution nozzle 22, even in the passive state.

The effect of either arrangement is to modulate the flow through the distribution nozzle 22 between an relatively higher active flow rate and a relatively lower passive flow rate. For example, an active flow rate may be defined as a flow rate greater than an average flow rate to the distribution nozzles 22, while a passive flow rate may be defined as a flow rate less than the average flow rate to the distribution nozzles 22. The average flow rate is determined by dividing the total flow rate of the first fluid F1 by the total number n of distribution nozzles 22/burner elements 20. Other relationships between the active flow rate and the passive flow rate may be used, with the active flow rate always being greater than the passive flow rate.

Regardless how the active and passive flow rates are determined, the passive flow rate must be greater than zero flow. The passive flow rate is sufficient to maintain combustion in each burner element 20, so as to provide a mechanism for immediate ignition when a burner element 20 is switched from the passive state to the active state. The non-zero passive flow rate also protects the distribution nozzle 22 from entry of foreign materials. In one embodiment, the passive flow rate is less than or equal to half of the active flow rate. In another embodiment, the ratio of the active flow rate to the passive flow rate is at least about 5 and no greater than about 40. In yet another embodiment, the ratio of the active flow rate to the passive flow rate is at least about 15 and no greater than about 25.

A second fluid F2 is supplied to the annular nozzles 24. A control valve 28 controls the total flow rate of the second fluid F2 to the annular nozzles 24, and a manifold 29 distributes the flow approximately equally across the n annular nozzles 24. A third fluid F3 is supplied to the staging nozzle 30, and the flow rate of the third fluid F3 is controlled by a control valve 32. The staging nozzle 30 may include a swirl vane or other mechanism (not shown) to impart swirl to the third fluid F3 exiting the staging nozzle 30. Swirl imparted on the third fluid F3 will result in break-up of that fluid jet, which can aid in entrainment of the third fluid F3 jet by the active jet(s). However, intense swirl is not desirable since it could dominate the flow structure and alter flame shapes.

The second fluid F2 and the third fluid F3 contain the same type of reactant, either fuel or oxidant. For example, when the first fluid F1 is fuel, the second fluid F2 and the third fluid F3 are each oxidants, and when the first fluid F1 is oxidant, the second fluid F2 and the third fluid F3 are each fuels. In one embodiment, the second fluid F2 and the third fluid F3 are different fluids, i.e., each has the same reactant (fuel or oxidant) but in different concentrations. In this case, the control valve 28 and the control valve 32 must be separate valves to control the two fluids F2 and F3. In an alternate embodiment (not shown), when the second fluid F2 and the third fluid F3 are the same fluid having the same concentration of the same reactant, a staging valve can be used in place of the control valve 28 and the control valve 32 to distribute a portion of the flow approximately equally to the n annular nozzles 24 and the remainder of the flow to the staging nozzle 30.

In the depicted embodiment, the flow rate of the second fluid F2 to each of the annular nozzles 24 is not controlled independently. As a result, each annular nozzle 24 always flows about an average flow rate of the second fluid F2 when the control valve 28 is open. The average flow rate is determined by dividing the total flow rate of the second fluid F2 by the total number n of annular nozzles 24/burner elements 20.

Alternatively, the flow rate of the second fluid F2 to each annular nozzle 24 may be independently controlled.

In the depicted embodiment, because the flow rate of the second fluid F2 to each annular nozzle 24 is about the same, each burner element 20 operates on either side of stoichiometric depending on whether that burner element 20 is active or passive at the time. When a burner element 20 is in the active state, that burner element 20 operates off of stoichiometric, and sometimes well off of stoichiometric, in one direction, and when the burner element 20 is in the passive state, that burner element 20 operates off of stoichiometric, and sometimes well off of stoichiometric, in the opposite direction. For example, when the first fluid F1 is fuel and the second fluid F2 is oxidant, a burner element 20 in the active state will operate fuel-rich and a burner element 20 in the passive state will operate fuel-lean. Alternatively, when the first fluid F1 is oxidant and the second fluid F2 is fuel, a burner element 20 in the active state will operate fuel-lean and a burner element 20 in the passive state will operate fuel-rich. However, because the total flow of fuel and oxidant is controlled by control valves 23 and 28 (and also by a staging control valve 32), the overall stoichiometry of the burner 10 remains the same regardless which, and how many, burner elements 20 are in the active state versus the passive state.

The stoichiometry at which each burner element 20 operates may be characterized by an equivalence ratio. For a given fuel flow rate, the equivalence ratio is determined as the ratio of theoretical stoichiometric oxygen flow to actual oxygen flow. For an oxidant that is 100% oxygen, the oxygen flow equals the oxidant flow. For an oxidant that an oxygen percentage X less than 100%, the oxygen flow in an oxidant stream is determined by dividing the oxidant flow rate by the oxygen percentage X; for example, to meet an oxygen requirement of 100 SCFH using an oxidant containing 40% oxygen, 250 SCFH of the oxidant is required.

The following discussion pertains to the embodiment in which the first fluid F1 is a fuel and the second fluid F2 and the third fluid F3 are both oxidants. When a burner element 20 is in the passive state, the equivalence ratio is less than about 1, and is preferably at least about 0.2. This signifies that a passive burner element 20 is operating fuel-lean, with as much as five times the oxygen required for complete combustion. In contrast, when a burner element 20 is in the active state, the equivalence ratio is greater than about 1, and is preferably no more than about 10. This signifies that an active burner element 20 is operating fuel-rich, with as little as 10% of the oxygen required for complete combustion.

A staging ratio is defined as the ratio of the amount of a reactant flowing through the staging nozzle 30 to the total amount of that reactant flowing through the annular nozzles 24 and the staging nozzle 30. For example, when the second fluid F2 and the third fluid F3 are oxidants, the staging ratio is the amount of oxygen provided by the staging nozzle 30 divided by the total amount of oxygen provided by the staging nozzle 30 and the annular nozzles 24 combined. If the second fluid F2 and the third fluid F3 are the same fluids (i.e., with the same oxygen concentration), then the staging ratio is simply the third fluid F3 flow rate divided by the sum of the second fluid F2 flow rate and the third fluid F3 flow rate. But if the second fluid F2 and the third fluid F3 are different fluids (i.e., with different oxygen concentrations X2 and X3, respectively), then the staging ratio is calculated to take into account the concentration differences, as $X_3F_3/(X_2F_2+X_3F_3)$, as would be understood by a person of skill in the art.

The burner 10 is preferably operated with a staging ratio of equal to or less than about 75%. For example, when oxidant is staged, i.e., when the second fluid F2 and the third fluid F3 are oxidants, at least about 25% of the oxygen to the burner 10 is flowed through the annular nozzles 24 and no more than about 75% of the oxygen is flowed through the staging nozzle 30. More preferably, the burner 10 is operated with a staging ratio of equal or less than about 40%. Further, as discussed above, because of the active or passive operation of each of the burner elements 20, the one or more burner elements 20 active at one time operate with an excess of the first fluid F1 compared to stoichiometric, and the one or more burner elements 20 that are passive at the same time operate with an excess of the second fluid F2 compared to stoichiometric, thereby providing some amount of staging even without taking into account the third fluid F3 provided by the staging nozzle 30.

The first fluid F1 exiting an active distribution nozzle 22 has an active jet velocity determined by the first fluid F1 flow rate and the cross-sectional area of the distribution nozzle 22. The second fluid F2 exiting an annular nozzle 24 has an annular jet velocity determined by the second fluid F2 flow rate and the cross-sectional area of the annular nozzle 24. Similarly, the third fluid F3 exiting the staging nozzle 30 has a staging jet velocity determined by the third fluid F3 flow rate and the cross-sectional area of the staging nozzle 30. The active jet velocity preferably is greater than the annular jet velocity. In addition, for optimal performance of the burner 10, the staging jet velocity should be less than or equal to the active jet velocity, and greater than or equal to about 0.05 times the active jet velocity. In one embodiment, the ratio of the staging jet velocity to the active jet velocity is less than or equal to about 0.4. In another embodiment, the ratio of the staging jet velocity to the active jet velocity is greater than or equal to about 0.1.

In one exemplary embodiment tested in a vertical firing arrangement (roof mounted), the first fluid F1 jet velocity through an active distribution nozzle 22 was at least about 250 ft/s and was preferably at least about 300 ft/s, and the velocity through a passive distribution nozzle 22 was about 20% of the active jet velocity. For a horizontal firing arrangement, the active jet velocity can be considerably lower since there is less need to combat buoyancy effects to avoid burner block overheating.

All of the control valves 23, 26, 28, and 32 are connected to and controlled by a controller 100 that is specifically programmed or configured to operate the burner 10. The controller 100 may include conventional electronics components such as a CPU, RAM, ROM, I/O devices, and the programming or configuration of the controller 100 may be accomplished by a combination of one or more of hardware, firmware, software, and any other mechanism now known or later developed for programming operating instructions into a controller.

As described above, at least one of the fluids F1, F2, and F3 must be or contain a fuel, and at least one of the fluids F1, F2, and F3 must be an oxidant or contain oxygen. The fuel can be a gaseous fuel, a liquid fuel, or a pulverized solid fuel in a gaseous carrier. In one embodiment, F1 is a fuel and F2 and F3 are oxidants. In this case, F2 and F3 may be the same oxidant, or F2 and F3 may be different oxidants. For example, in one preferred embodiment, F1 is a gaseous fuel such as natural gas, F2 is an oxidant having an oxygen concentration of equal to or greater than about 70%, and F3 is an oxidant having an oxygen concentration of equal to or greater than about 20.9%. In another similar embodiment, F1 is a gaseous fuel such as natural gas, F2 is an oxidant having an oxygen concentration greater than that of air, and F3 is air.

In an alternate embodiment, F1 is an oxidant and F2 and F3 are fuels. In this case F1 has an oxygen concentration equal to or greater than about 26%, preferably equal to or greater than about 40%, and more preferably equal to or greater than about 70%.

Figure 3:
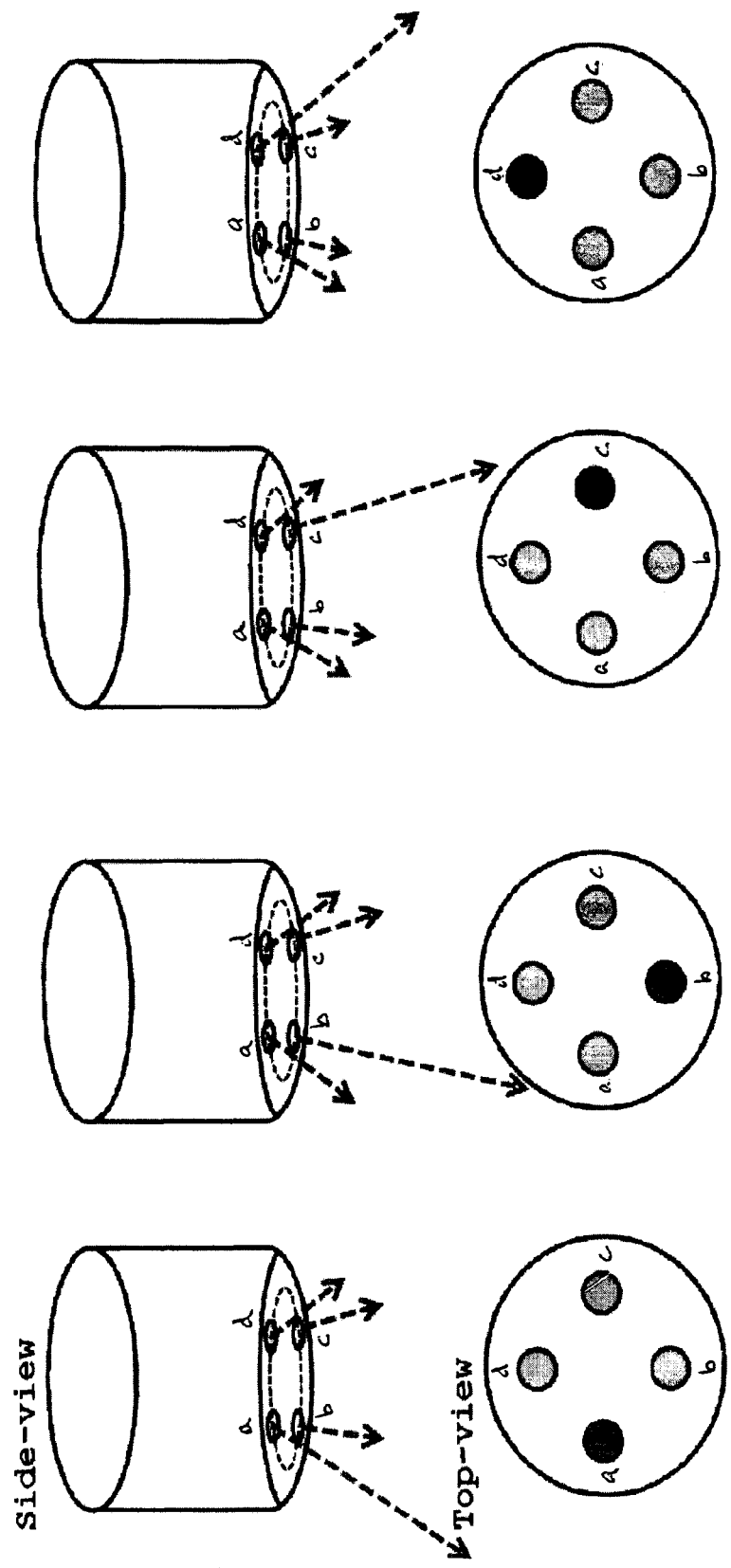
FIG. 3 is an operational sequence schematic for an embodiment of a transient heating burner as in FIG. 1.

FIG. 3 shows one possible sequence of operation for the embodiment of the burner 10 illustrated in FIG. 1. For purposes of discussion, the four burner elements 20 are labeled as a, b, c, and d. As shown, only one burner element 20 is active at a time, while the remaining burner elements 20 are passive, and each burner element 20 is successively switched to the active state when the previously active burner element 20 is returned to the passive state.

In particular, in the depicted embodiment, burner element 20a is active while burner elements 20b, 20c, and 20d are passive. In other words, each of the annular nozzles 24 in each burner element 20 is receiving an approximately equal flow of the second fluid F2, and only the distribution nozzle 22 in burner element 20a is receiving a higher active flow of the first fluid F1, while the distribution nozzles 22 in the other burner elements 20b, 20c, and 20d are receiving a lower passive flow of the first fluid F1. This results in a relatively long, penetrating flame emanating from the active burner element 20a and relatively short (pilot) flames emanating from the passive burner elements 20b, 20c, and 20d. As further shown in the depicted embodiment, when burner element 20b becomes active, burner element 20a returns to the passive state and burner elements 20c and 20d remain passive. Next, when burner element 20c becomes active, burner element 20b returns to the passive state and burner elements 20c and 20a remain passive. Finally, when burner element 20d becomes active, burner element 20d returns to the passive state and burner elements 20a and 20b remain passive.

The sequence shown in FIG. 3 and described above is only one of essentially limitless variations. In one non-limiting example, one burner element 20 is active at a time in a repeating sequence such as a-b-c-d or a-b-d-c or a-c-b-d or a-c-d-b. In another non-limiting example, one burner element 20 is active at a time in a random sequence. In yet another non-limiting example, one burner element 20 is active at a time but each for either the same or different lengths of time.

Further, in other examples, more than one burner element 20 is active at a time. For example, for a burner 10 having three or more burner elements 20, two burner elements 20 may be active and the remainder passive. In general, for a burner 10 having n burner elements, any number of burner elements from 1 to n−1 may be active, and the remainder passive.

Each burner element 20 can be switched from the passive to the active state based on a preprogrammed time sequence, according to a predetermined algorithm, according to a random sequence, or depending on furnace conditions. One or more sensors 110 may be positioned in the furnace for sensing any parameter that may be relevant to determining locations where more or less combustion heat is needed. For example, the sensor may be a temperature sensor, such that when the temperature sensor is below a threshold setting, the burner element 20 oriented to heat the furnace in the region of that temperatures sensor may be made active more frequently or for longer periods of time. Or if a temperature sensor detects that a portion of the furnace or charge is receiving insufficient heat, one or more burner elements 20 positioned near that portion of the furnace or angled toward that portion of the charge can be switched to the active state, while burner elements 20 in portions of the furnace receiving excess heat can be switched to the passive state.

Temperatures sensors may include contact sensors such as thermocouples or RTDs located in the furnace walls, or non-contact sensors such as infrared sensors, radiation sensors, optical sensors, cameras, color sensors, or other sensors available to those in the industry. Other types of sensors may also be used to indicate the level of melting or heating in the furnace, including but not limited to proximity sensors (e.g., to sense the proximity of solid charge that has yet to melt) or conductivity sensors (e.g., to detect the higher conductivity of a liquid as compared to chunks of poorly interconnected solids).

Several benefits can be achieved by operation of the burner 10 as described herein. Because heat can be preferentially directed to certain locations and for longer or shorter periods of time, cold spots in the furnace can be identified and eliminated, resulting in more uniform heating and melting. Particularly for vertical firing arrangements (i.e., roof-mounted burners pointing downward) as in FIG. 7, operating the burner with less than all of the burner elements 20 in active mode reduces or eliminates the hazards of buoyant flames, thereby avoiding overheating of the burner block and furnace roof. The fuel-rich combustion resulting from an active burner element 20, where the oxygen provided through the annular nozzle 24 is significantly less than the stoichiometric oxygen required by the fuel provided through the distribution nozzle 22, creates a non-oxidizing atmosphere near the melt bath to help protect the charge from undesirable oxidation. Additionally, activating the burner elements 20 in a repeated cyclical pattern can b used to generate a vortex heating pattern that increases residence time of combustion gases, increases heat transfer rates, and improves uniformity of heating, as shown for example in US 2013/00954437. Further, selective activation of burner elements 20 and variation of the staging ratio can be used to adjust the location of maximum heat flux emanating from the combustion reactions and to adjust flame coverage to accommodate various furnace geometries, conditions, and charge levels.

Figure 5:
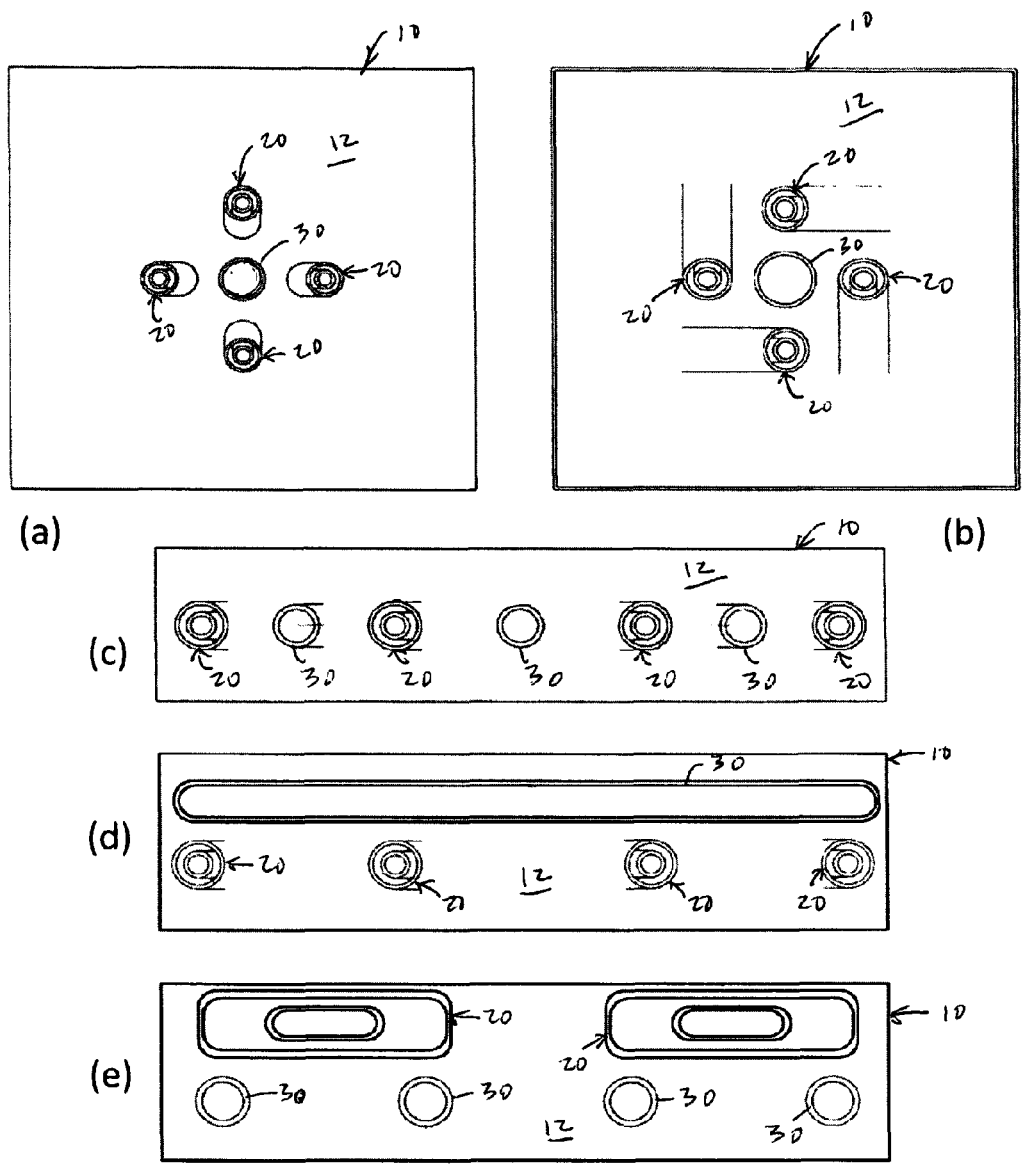
FIGS. 5a-5e are end views of various embodiments of a transient heating burner.

Various possible configurations of the burner include those shown in FIG. 5. In an embodiment of the type shown in FIG. 5a, one or more of the burner elements 20 may be angled radially outward at an angle α from the circle circumscribed by the burner elements 20, or from an axis defined by the staging nozzle 30. Although the depicted embodiment shows all four burner elements 20 angled radially outward at the same angle α, it is understood that each burner element 20 may be angled at a different angle $α_n$, depending on the furnace geometry and desired operating characteristics of the burner 10. The angle α may be equal to or greater than about 0° and is preferably equal to or less than about 60°. More preferably, the angle α is at least about 10° and no greater than about 40°.

In an embodiment of the type shown in FIG. 5b, one or more burner elements 20 may be angled tangentially to the circumscribed circle at an angle β to create swirl. Although the depicted embodiment shows all four burner elements 20 angled tangentially at the same angle β, it is understood that each burner element 20 may be angled at a different angle $β_n$, depending on the furnace geometry and desired operating characteristics of the burner 10. The angle β may be equal to or greater than about 0° and is preferably equal to or less than about 60°. More preferably, the angle β is at least about 10° and no greater than about 40°.

In an embodiment of the type shown in FIG. 5c, a plurality of burner elements 20 are positioned generally collinearly with each other to define a line having a midpoint and ends. Although four burner elements 20 are shown, this embodiment is applicable to a configuration with at least two burner elements 20 and up to as many burner elements 20 as may be required in a particular furnace. A staging nozzle 30 is positioned between each adjacent pair of burner elements 20, so that the burner elements 20 and staging nozzles 30 alternate. For example, an arrangement with two burner elements 20 has one staging nozzle 30 positioned between the two burner elements 20, and an arrangement with three burner elements 20 has two staging nozzles 30 each positioned between a pair of adjacent burner elements 20. The burner elements 20 may all be oriented perpendicularly to the burner face 14, or some or all of the burner elements 20 may be angled outward at an angle γ of less than or equal to about 45° from the line midpoint toward one of the line ends. Similarly, the staging nozzles 30 may be oriented perpendicularly to the burner face 14, or some or all of the staging nozzles 30 may be angled in one direction or the other along the line. In the depicted embodiment, a central staging nozzle 30 is oriented perpendicularly to the burner face 14, and a series of three collinear elements—a burner element 20, a staging nozzle 30, and another burner element 20—are positioned diametrically to either side and angled away from the central staging nozzle 30 and toward their respective ends of the line.

In an embodiment of the type shown in FIG. 5d, a plurality of burner elements 20 are positioned collinearly with each other to define a line having a midpoint and ends. Although four burner elements 20 are shown, this configuration is application to a configuration with at least two burner elements 20 and up to as many burner elements 20 as may be required in a particular furnace. An elongated or generally rectangular staging nozzle 30 having a major axis at least 1.5 times as long as a minor axis is positioned adjacent to and spaced apart by a fixed distance from the burner elements 20, with the major axis substantially parallel to the line defined by the burner elements 20. The burner elements 20 may all be oriented perpendicularly to the burner face 14, or some or all of the burner elements 20 may be angled outward at an angle γ of less than or equal to about 45° from the line midpoint toward one of the line ends.

In an embodiment of the type shown in FIG. 5e, each burner element 20 has a flat-flame configuration, wherein both the distribution nozzle 22 and the annular nozzle 24 have an elongated or generally rectangular configuration having a major axis at least 1.5 times as long as a minor axis. This type of flat flame burner is described in detail, for example in U.S. Pat. No. 5,611,682. At least two staging nozzles 30 are positioned adjacent to and spaced apart from the burner element 20, and are oriented generally collinearly to define a line that is substantially parallel to the major axis of the burner element 20. At least two burner elements 20 are utilized in this configuration.

In any of the above-described configurations in FIG. 5, a transient operation scheme can be implemented similar to that describe above for the configuration of FIG. 1. Specifically, at any given time, at least one burner element 20 is operated in an active state, wherein the fluid flow through an active distribution nozzle 22 is greater than the average fluid flow through all of the distribution nozzles 22, while at least one burner 20 is operated in the passive stage, wherein the fluid flow through a passive distribution nozzle 22 is less than the average fluid flow through all of the distribution nozzles 22.

Figure 7:
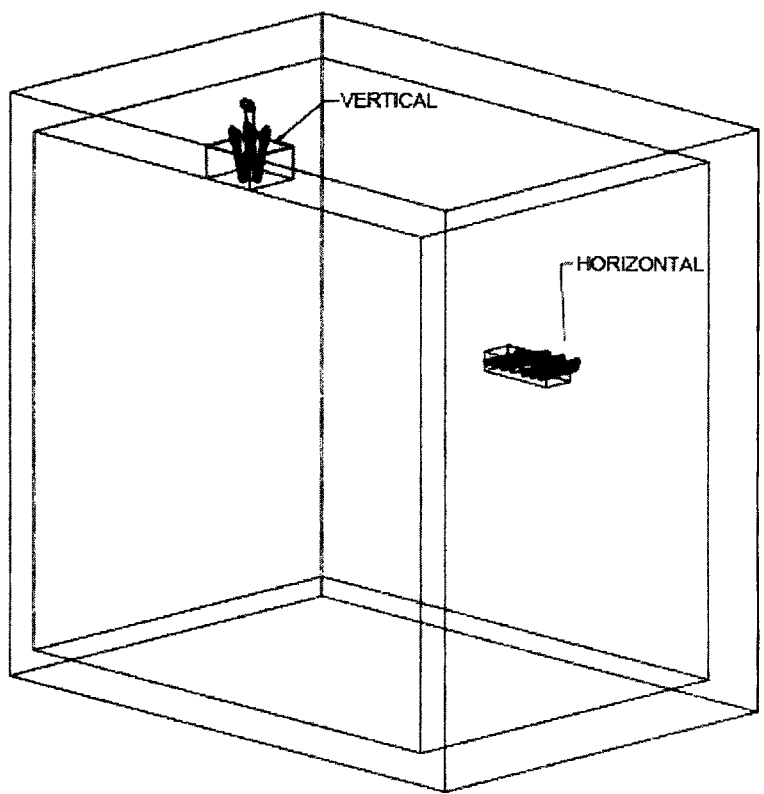
FIG. 7 is a perspective view of a furnace showing two possible mounting orientations of a transient heating burner.

As shown in FIG. 7, one or more burners 10 may be mounted in the roof of a furnace 200 (vertically installation) or in a sidewall of a furnace 200 (horizontal installation). In a vertical installation, the burner elements 20 are preferably arranged in a configuration such as in FIG. 5a or FIG. 5b, to provide optimal heat flux to the charge while preventing overheating of the burner block. For example, as discussed above, the burner elements 20 can be oriented to angle radially outward from the circumscribed circle that encloses the staging nozzle 30 (FIG. 5a). Alternatively, the burner elements 20 can be oriented in a vortex configuration (angled tangentially to the circumscribed circle) (FIG. 5b). In a horizontal configuration, the burner elements 20 can be arranged in any array, and in particular may be arranged as in any of FIGS. 5c-5e depending on the geometry of the furnace.

Figure 8:
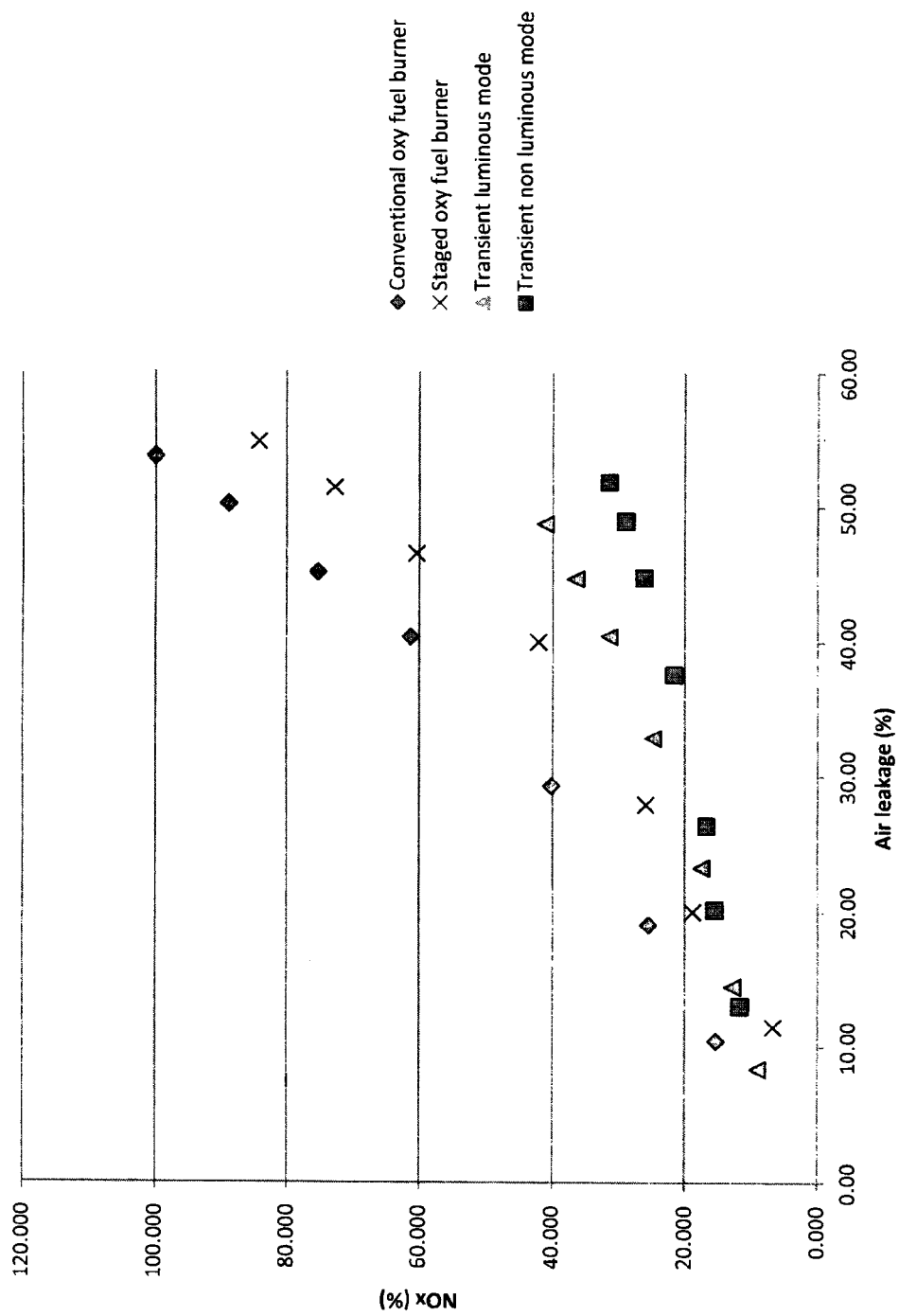
FIG. 8 is a graph comparing on a relative scale NOx production data from a conventional oxy-fuel burner, a conventional staged oxy-fuel burner, and a transient heating burner, in both luminous and non-luminous modes.

As shown in the data of FIG. 8, the burner 10 exhibits reduced NOx emissions compared with conventional oxy-fuel burners. Note that the scale of FIG. 8 is relative, normalized to the peak NOx of a conventional oxy-fuel burner. When the burner 10 is operated transiently as described herein in a luminous mode (i.e., with a low shape factor distribution nozzle 22), the peak NOx emissions are only about 40% of that emitted by a conventional oxy-fuel burner. When the burner 10 is operated transiently as described herein in a non-luminous mode (i.e., with a high shape factor distribution nozzle 22), the peak NOx emissions are even lower, only about 35% of that emitted by a conventional oxy-fuel burner. In both cases, the burner 10 was operated with fuel as the distributed fluid and oxidant as the staged fluid. Without being bound by theory, this surprising result is thought to be a result of the highly staged nature of the combustion produced by the burner 10, which results in a first fuel-rich flame zone that produces low NOx due to limited oxygen availability, and a second fuel-lean flame zone that produces low NOx due to its low combustion temperatures.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A transient heating burner comprising:
  at least two burner elements each comprising:
    a distribution nozzle configured to flow a fuel; and
    an annular nozzle surrounding the distribution nozzle and configured to flow a first oxidant;
  at least one staging nozzle configured to flow a second oxidant; and
  a controller programmed:
    to independently control the fuel flow to each distribution nozzle such that at least one of the distribution nozzles is active and at least one of the distribution nozzles is passive, wherein fuel flow in an active distribution nozzle is greater than an average fuel flow to the distribution nozzles and fuel flow in a passive distribution nozzle is less than the average fuel flow to the distribution nozzles; and
    to control a staging ratio to be less than or equal to about 75%, wherein the staging ratio is the ratio of the oxygen contained in the second oxidant flow to the sum of the oxygen contained in the first and second oxidant flows.

2. The burner of claim 1,
  wherein the burner elements are spaced substantially evenly apart in a circumscribed circle; and
  wherein the staging nozzle is positioned within the circumscribed circle.

3. The burner of claim 2, wherein at least one of the burner elements is angled radially outward at an angle α from the circumscribed circle, wherein the angle α is less than or equal to about 60°.

4. The burner of claim 2, wherein at least one of the burner elements is angled tangentially at an angle β with respect to the circumscribed circle, wherein the angle β is less than or equal to about 60°.

5. The burner of claim 1, wherein the burner elements and the staging nozzle are positioned collinearly with each staging nozzle located equidistant between two burner elements.

6. The burner of claim 1,
wherein the distribution nozzles and annular nozzles each have a cross-section with a minor axis and a major axis at least 1.5 times as long as the minor axis; and
wherein at least two staging nozzles are positioned collinearly, and are adjacent to each burner element and substantially parallel to the major axes.

7. The burner of claim 1,
wherein the staging nozzle has a cross-section with a minor axis and a major axis at least 1.5 times as long as the minor axis; and
wherein at least two burner elements are positioned collinearly, and are adjacent to the staging nozzle and substantially parallel to the major axis.

8. The burner of claim 1, wherein the controller is programmed to control fuel flow to a passive distribution nozzle to be greater than zero and less than or equal to half the flow rate of an active distribution nozzle.

9. A method of operating a burner in a furnace, the burner having at least one staging nozzle and at least two burner elements each comprising a distribution nozzle surrounded by an annular nozzle, the method comprising:
flowing oxidant at a staging flow rate through the staging nozzle;
flowing oxidant at a primary oxidant flow rate through each of the annular nozzles;
selecting at least one of the distribution nozzles to be active and at least one of the distribution nozzles to be passive;
flowing fuel at an active jet flow rate through the active distribution nozzles; and
flowing fuel at a passive jet flow rate through the passive distribution nozzles;
wherein the active jet flow rate is greater than an average fuel flow rate through the distribution nozzles and the passive jet flow rate is less than the average fuel flow rate through the distribution nozzles.

10. The method of claim 9, wherein a staging ratio is the ratio of the oxygen contained in the oxidant flowing through the staging nozzle to the sum of the oxygen contained in the oxidant flowing through the staging nozzle and oxygen contained in the oxidant flowing through the annular nozzles, and wherein the staging ratio is less than or equal to about 40%.

11. The method of claim 9, wherein fuel exiting an active distribution nozzle has an active jet velocity and oxidant exiting the staging nozzle has a staging jet velocity; and
wherein the ratio of the staging jet velocity to the active jet velocity to be at least about 0.05 and less than 1.

12. The method of claim 9,
wherein the oxidant flowing through the annular nozzles has an oxygen concentration of equal to or greater than about 70%.

13. The method of claim 9,
wherein the oxidant flowing through the staging nozzle has an oxygen concentration of equal to or greater than about 20.9%.

14. The method of claim 9,
wherein the ratio of the active jet flow rate to the passive jet flow rate to be from about 5 to about 40.

15. The method of claim 9, wherein a burner element having a passive distribution nozzle has an equivalence ratio of from about 0.2 to about 1, wherein the equivalence ratio is the ratio of theoretical stoichiometric oxidant flow through the annular nozzle to actual oxidant flow through the annular nozzle to combust the fuel flowing through the distribution nozzle, and wherein a burner element having an active distribution nozzle has an equivalence ratio of from about 1 to about 10, wherein the equivalence ratio is the ratio of theoretical stoichiometric oxidant flow through the annular nozzle to actual oxidant flow through the annular nozzle to combust the fuel flowing through the distribution nozzle.

16. The burner of claim 1, further comprising a sensor configured to provide a signal to the controller;
wherein the controller is programmed to control each distribution nozzle to be active or passive based on the signal;
wherein the sensor is selected from the group consisting of temperature sensors, radiation sensors, optical sensors, cameras, color sensors, conductivity sensors, proximity sensors, and combinations thereof.

17. The method of claim 9, further comprising:
sensing a parameter in the furnace;
reselecting which distribution nozzles are active and which distribution nozzles are passive based on the sensed parameter; and
periodically repeating the sensing and reselecting steps.

* * * * *